3,418,363
PROCESS OF PREPARING ALKYL HYDROXY-ALKYL FUMARATES

Erhard J. Prill, St. Louis, Mo., assignor to Monsanto Company, St. Louis, Mo., a corporation of Delaware
No Drawing. Filed July 21, 1965, Ser. No. 473,862
7 Claims. (Cl. 260—485)

This invention relates to a process for the preparation of alkyl hydroxyalkyl fumarates.

Alkyl hydroxyalkyl fumarates are valuable monomers of particular interest for copolymerization with other monomers having olefinic unsaturation, e.g. vinyl chloride. The resulting copolymers have free hydroxyl groups which provide sites for further reaction such as cross-linking.

According to this invention alkyl hydroxyalkyl fumarates are prepared by a process which comprises reacting fumaric acid with an excess of both monohydric aliphatic hydrocarbon alcohol and alkylene glycol in the presence of an acid esterification catalyst at a temperature from about 80° C. to 150° C. until the reaction mixture acid number remains substantially constant.

Acid number as used herein is a number which indicates the amount of free acid present in a substance and is expressed by the number of milligrams of potassium hydroxide which are required to neutralize the acid in a gram of the substance.

The monohydric alcohols used in the present invention can be represented by the formula ROH wherein R is an alkyl radical from 1 to 8 carbon atoms. Representative monohydric alcohols are methyl alcohol, ethyl alcohol, n-propyl alcohol, isopropyl alcohol, n-butyl alcohol, isobutyl alcohol, amyl alcohol, hexyl alcohol, heptyl alcohol and octyl alcohol.

Akylene glycols such as, for example, ethylene glycol, propylene glycol, butylene glycol, trimethylene glycol, 1,4-butane diol, etc. can be used in this invention although ethylene glycol is preferred.

For the sake of brevity and simplicity this invention will be discussed hereinafter with reference to the reaction of fumaric acid with ethyl alcohol and ethylene glycol as set forth below.

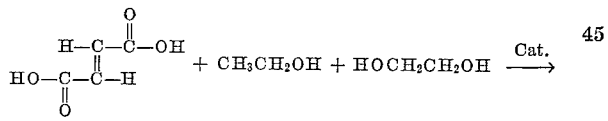

(I) Ethyl hydroxyethyl fumarate

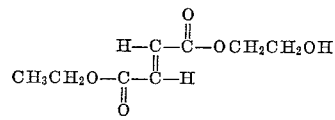

(II) Bis(hydroxyethyl) fumarate

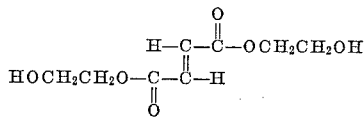

(III) Diethyl fumarate

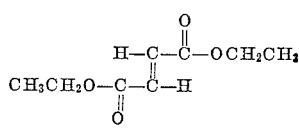

The esterification reaction of this invention is an equilibrium reaction wherein one mol of fumaric acid is converted into a reaction product comprising, after removal of excess ethyl alcohol, excess ethylene glycol and catalyst, about 40 mol percent ethyl hydroxyethyl fumarate, about 30 mol percent diethyl fumarate and about 30 mol percent bis(2-hydroxyethyl)fumarate.

In carrying out the process of this invention fumaric acid, excess ethyl alcohol, excess ethylene glycol and acid esterification catalyst are charged to a reaction vessel and heated to reaction temperature. Water of reaction is removed from the reaction medium during the reaction by any of the well known methods. Reaction is continued until the fumaric acid is substantially completely reacted. The progress of the reaction is followed by periodic determination of the reaction mixture acid number and reaction is discontinued when the reaction mixture acid number has remained substantially constant over about a ½ hour period. Essentially complete reaction of fumaric acid occurs without the formation of adverse polymer products. At the completion of the reaction, excess ethyl alcohol, ethylene glycol and diethyl fumarate are removed from the reaction mixture by conventional means, e.g. distillation. Ethyl hydroxyethyl fumarate can then be recovered from the product mixture in essentially pure form by conventional means.

Conversion of fumaric acid to ethyl hydroxyethyl fumarate by the equilibrium batch reaction of this invention is about 40%. Overall conversions approaching 100% can be obtained when the excess ethyl alcohol, excess ethylene glycol, by-product diethyl fumarate and the by-product bis(2-hydroxyethyl) fumarate are recycled to the reaction vessel. If recycle is used an amount of ethyl alcohol, ethylene glycol and fumaric acid at least equivalent to that in the ethyl hydroxyethyl fumarate product is added to the reaction vessel containing the forerun and residue along with acid catalyst and reaction is continued. When the reaction is run with recycle, conversion of fumaric acid to ethyl hydroxyethyl fumarate is also about 40%. The same conversion when using recycle shows that polymers other than those which reequilibrate are not formed in the reaction. Since adverse polymer formation does not occur, conversions approaching 100% are easily obtained by recycling the excess reactants and by-products.

The following examples will serve to illustrate the present invention. Parts and percent are by weight unless otherwise specified.

EXAMPLE 1

A reaction vessel equipped with stirrer, thermometer, safety feed funnel, sample outlet and reflux condenser is charged with 405 gm. (3.5 mol) fumaric acid, 1080 gm. (17.5 mol) ethylene glycol, 775 gm. (16.9 mol) absolute ethyl alcohol and 5 ml. concentrated sulfuric acid. The reactants are refluxed for about 8.5 hours at about 100° C. About 3000 ml. of aqueous ethyl alcohol are removed from the reaction mixture during the reaction and replaced by 3000 ml. of absolute ethyl alcohol as removed. Progress of the reaction is determined by periodic determination of the reaction mixture acid number and the reaction is stopped after about 8½ hours when the acid number has remained constant for about one hour. The reaction mixture weighs 2445 gm. A portion of the reaction mixture is subjected to analysis by vapor phase chromatography. The analysis shows an ethyl hydroxyethyl fumarate content of 10.7% and this corresponds to a 39.9% conversion of fumaric acid to ethyl hydroxyethyl fumarate. A portion of the reaction mixture (612 gm.) is slurried with 10 gm. of powdered calcium carbonate for four hours and then filtered. The filtrate is fractionally distilled under reduced pressure. Ethyl alcohol is removed at about 60° C. to 70° C., 100 mm. Ethylene glycol is removed at about 50–60° C., 0.05 mm. Diethyl fumarate is removed at about 70° C., 0.05 mm. The above forerun amounts to 454 gm. The product fraction amounting to 52 gm. is removed at about 100° C., 0.001 mm. A residue of bis(hydroxyethyl) fumarate, 78 gm., remains in the still. The product fraction contains, by vapor phase chromatography analysis, 91% ethyl hydroxyethyl fumarate, 4% diethyl fumarate and 5% bis(2-hydroxyethyl) fumarate.

EXAMPLE 2

The 454 gm. forerun (ethyl alcohol, ethylene glycol and diethyl fumarate) and residue, 78 gm., removed from the reaction product of Example 1 are charged to a reaction vessel equipped as in Example 1. Make-up fumaric acid 32.14 gm., ethyl alcohol 12.16 gm. and ethylene glycol 13.0 gm. equivalent to that in the product weight of Example 1, 13 gm. ethyl alcohol to replace evaporation loss and 1 ml. of sulfuric acid are then charged to the reaction vessel. The reaction mixture is refluxed at about 100° C. with removal of aqueous ethyl alcohol and addition of absolute ethyl alcohol as in Example 1. The reaction is stopped after 7 hours at which time the reaction mixture acid number has been constant for about 1 hour. Analysis of the reaction mixture by vapor phase chromatography shows the ethyl hydroxyethyl fumarate content at 10.0%. This is equivalent to 39.9% conversion of fumaric acid to ethyl hydroxyethyl fumarate.

It will be noted that the same equilibrium conversion was obtained in the recycle run of Example 2 as in Example 1. This demonstrates that no polymers are formed in the reaction which will not re-equilibrate upon recycle. With recycle, the process of this invention results in high conversion (approaching 100%) of fumaric acid to ethyl hydroxyethyl fumarate.

EXAMPLE 3

A reaction vessel equipped with stirrer, thermometer, sample outlet, safety feed funnel, and Dry-Ice condenser is charged with 2 mols fumaric acid, 10 mols n-butyl alcohol, 10.2 mols butylene glycol and 40 gm. Dowex-50. The reaction mixture is refluxed at about 100° C. and the pressure reduced to about 80 mm. At this pressure the water formed is removed without appreciable loss of butylene glycol or n-butyl alcohol. Progress of the reaction is followed by periodic determination of reaction mixture acid number. After about 7 hours the acid number has remained constant for about ½ hour and reaction is stopped. The catalyst is removed from the reaction mixture by filtration. The reaction mixture is then subjected to distillation procedures similar to those employed in Example 1. Vapor phase chromatography analysis of the product cut shows a recovery of 0.76 mol of butyl hydroxybutyl fumarate and this is equivalent to a 38% conversion.

EXAMPLE 4

A reaction vessel equipped as in Example 3 is charged with 2 mols fumaric acid, 10 mols of octyl alcohol, 11 mols propylene glycol and 40 grams Dowex-50. The reaction mixture is refluxed at about 100° C. and the pressure reduced to about 70 mm. At this pressure the water formed is removed without appreciable loss of propylene glycol or octyl alcohol. Progress of the reaction is followed by periodic determination of reaction mixture acid number. After about 6 hours the acid number has remained constant for about ½ hour and reaction is stopped. The catalyst is removed from the reaction mixture by filtration. The reaction mixture is then subjected to distillation procedures similar to those employed in Example 1. Vapor phase chromatography analysis of the product cut shows a recovery of 0.77 mol of octyl hydroxypropyl fumarate and this is equivalent to a 38.5% conversion.

Ethyl hydroxyethyl fumarate can be recovered from the reaction mixture by any of the conventional means well known in the art. For example, conventional procedures such as selective extraction and fractional distillation using a carrier gas can be used in place of the fractionation techniques of the examples.

While the fumaric acid-alcohol-glycol reaction of this invention can be catalyzed by any of the well-known acid catalysts such as sulfuric acid, phosphoric acid, p-toluene sulfonic acid and the like, it is preferred that an acid cation exchange resin be employed. Any of the well known acid cation exchange resins are suitable. Many of these acid resins are prepared by sulfonating a copolymer of styrene and a polyvinylidene monomer, such as divinylbenzene, trivinylbenzene, as well as polyvinyl ethers of polyhydric alcohols such as divinyloxyethane and trivinoxypropane. The sulfonating agent may be concentrated sulfuric acid, oleum sulfur trioxide and the like. Examples of commercially available sulfonic cation exchange resins include Dowex 50 (available from Dow Chemical Company, Midland, Mich.), Amberlite IR-120 and Amberlite 15 (the latter two available from Rohm and Haas Company, Philadelphia, Pa.). The use of acid cation exchange resins as catalysts in the present invention results in a number of marked advantages. The advantages which are obtained by the use of these resins include the ease of reaction, the convenience with which the catalyst can be removed from the reaction product, the economical features of recycling the recovered solid resin catalyst for re-use in further esterification and the lack of corrosion of metal equipment.

When a sulfonic ion-exchange resin is used as catalyst in this invention the ratio of mols of resin (a "mol" of resin is defined as the weight in grams of dehydrated resin per sulfonic acid group) per mol of fumaric acid, may vary from 0.02 to 0.2. A preferred ratio is 0.05 to 0.10.

Preferably about 1 to 5 weight percent of non-ion exchange resin acid catalyst based on fumaric acid is used to catalyze the reaction of this invention. Higher amounts of catalyst, such as 10 weight percent or more based on fumaric acid can be used, however, this causes a correspondingly reduced yield of product. On the other hand as little as about 0.5 percent or less based on the fumaric acid can be used by extending the reaction time.

The reaction in accordance with this invention is carried out in the presence of both excess alcohol and excess glycol. The excess alcohol and glycol are required to aid in the supression of undesired side reactions and in the prevention of excessive polymer formation. The ratio of mols of glycol per mol of fumaric acid may vary from about 2 to 20 or more. Molar ratios of glycol to acid from about 2 to 10 are preferred. The ratio of mols of alcohol per mol of fumaric acid may vary from about 2 to 20 or more. Molar ratios of alcohol to acid from about 2 to 10 are preferred. It is not necessary that the glycol and alcohol be used in the same molar ratios. It is only necessary that the monohydric aliphatic alcohol and the alkylene glycol are each employed in amounts of at least 2 mols for each mol of fumaric acid used.

As mentioned hereinbefore reaction temperature is critical but only in regard to the upper limit. Reaction temperature is generally maintained from about 80° C. to 150° C. The reaction temperature should not exceed about 150° C. since undesirable polymerization may be thermally initiated at such high temperatures. Reaction temperatures in the range from about 80° C. to 120° C. are preferred. Atmospheric, superatmospheric or subatmospheric pressures may be employed in the reaction. The reaction is preferably carried out at subatmospheric pressures when higher alkyl alcohols are used to obviate the problem of removing water of esterification. When the reaction is carried out at reduced pressure, the water formed is easily removed without removing an appreciable amount of glycol or higher alkyl alcohol. When the reaction is carried out at other than reduced pressure, the water formed can be removed by the continuous or intermittent removal of aqueous alcohol and replacement thereof with anhydrous alcohol. If desired azeotropic dehydration of the aqueous alcohol removed during reaction can be employed regardless of reaction pressure and the dehydrated alcohol returned to the reaction vessel. Azeotropic dehydration can be used with any of the operable alkyl alcohols although this method is more beneficial with the lower alkyl alcohols. The dehydration of ethyl alcohol with benzene is a well-known example of azeotropic dehydration. A large number of other third components or entrainers such as toluene, xylene and the like can be used for this separation as is well known in the art.

A polymerization inhibitor to protect against vinyl polymerization may be added to the charge. As a rule such inhibitors are not required but sometimes they are desirable in certain embodiments. Common polymerization inhibitors include p-(t-butyl)catechol, hydroquinone, benzoquinone, p-phenylene diamine, trinitrobenzene, picric acid, etc. When a polymerization inhibitor is used, it is generally introduced in about one-tenth to fifty parts per thousand based on the weight of fumaric acid employed.

What is claimed is:

1. Process for preparing alkyl hydroxyalkyl fumarates which comprises reacting fumaric acid with a alcohol of the formula ROH wherein R is selected from the group consisting of alkyl of 1 to 8 carbon atoms and hydrocarbon substituted alkyl of 1 to 8 carbon atoms and an alkyklene glycol selected from the group consisting of ethylene glycol, propylene glycol and butylene glycol, wherein said monohydric aliphatic alcohol and said alkylene glycol are each present in an amount of at least about 2 mols for each mol of fumaric acid, in the presence of acid esterification catalyst selected from the group consisting of sulfuric acid, phosphoric acid and acid cation exchange resins at a temperature from about 80° C. to 150° C. until the reaction mixture acid number remains substantially constant, removing alkyl hydroxyalkyl fumarate from the reaction mixture and recycling the reaction mixture after removal of alkyl hydroxyalkyl fumarate to the reaction vessel.

2. Process of claim 1 wherein the alcohol is ethyl alcohol and the alkylene glycol is ethylene glycol.

3. Process of claim 1 wherein the catalyst is a sulfonic acid cation exchange catalyst present in an amount of about 0.02 to 0.2 mol of catalyst per mol of fumaric acid.

4. Process of claim 1 wherein the alcohol is propyl alcohol and the alkylene glycol is propylene glycol.

5. Process of claim 1 wherein the temperature is from about 80° C. to 120° C.

6. Process of claim 1 wherein the alcohol is propyl alcohol.

7. Process of claim 1 wherein the reaction mixture is separated by distillation into excess reactant, by-products and alkyl hydroxyalkyl fumarate product and the excess reactant and by-products are recycled to the reaction vessel along with the required amount of make-up alcohol, glycol and acid catalyst.

References Cited

UNITED STATES PATENTS 2,106,703  2/1938  Cox et al. _____ 260—485

FOREIGN PATENTS 588,784  12/1959  Canada.

OTHER REFERENCES

Calmon et al.: Ion Exchangers in Organic and Biochemistry, Interscience, New York, 1957, pp. 658, 659, 668 and 669. QD561C3.

LORRAINE A. WEINBERGER, *Primary Examiner.*

T. GALLOWAY, *Assistant Examiner.*